United States Patent
Seo

(10) Patent No.: US 9,985,399 B2
(45) Date of Patent: May 29, 2018

(54) ACCESSORY SHOE DEVICE TO WHICH ACCESSORY IS ATTACHED, IMAGE PICKUP APPARATUS, AND ACCESSORY

(71) Applicant: CANON KABUSHIKI KAISHA, Tokyo (JP)

(72) Inventor: Takazumi Seo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/423,034

(22) Filed: Feb. 2, 2017

(65) Prior Publication Data
US 2017/0222384 A1  Aug. 3, 2017

(30) Foreign Application Priority Data

Feb. 3, 2016  (JP) ................................. 2016-018796
Nov. 24, 2016  (JP) ................................. 2016-227917

(51) Int. Cl.
| | |
|---|---|
| H04N 5/225 | (2006.01) |
| H04N 5/232 | (2006.01) |
| H04N 5/235 | (2006.01) |
| G03B 17/56 | (2006.01) |
| H01R 33/76 | (2006.01) |

(52) U.S. Cl.
CPC ....... H01R 33/7664 (2013.01); H04N 5/2252 (2013.01); H04N 5/2354 (2013.01); H04N 5/23293 (2013.01); *G03B 2215/056* (2013.01)

(58) Field of Classification Search
CPC ............. H04N 5/2252; H04N 5/23293; H04N 5/2354; G03B 17/566; G03B 2215/056; H01R 33/7664

USPC .................. 348/373–376; 396/544, 422, 638
See application file for complete search history.

(56) References Cited

U.S. PATENT DOCUMENTS

| | | | | |
|---|---|---|---|---|
| 9,182,109 B2* | 11/2015 | Lew | ...................... | F21V 23/005 |
| 2012/0189292 A1* | 7/2012 | Kim | ...................... | G03B 15/03 |
| | | | | 396/198 |

FOREIGN PATENT DOCUMENTS

| | | | | |
|---|---|---|---|---|
| GB | 2516098 A | * | 1/2015 | ............. G03B 13/06 |
| JP | 4042717 B | | 2/2008 | |

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An accessory shoe device enabling multi-polarization of a connector for connection to an accessory without degrading the versatility thereof. The accessory is attached to an engagement member. A signal terminal connector has contacts arranged in a lateral direction orthogonal to an attaching direction. A pair of first engagement portions in the engagement member are spaced by a first width in the lateral direction, and a pair of second engagement portions in the engagement member are spaced by a second width larger than the first width. The signal terminal connector is disposed forward of the first engagement portions in the attaching direction. A length of the signal terminal connector in the lateral direction is larger than the first width and smaller than the second width. The second engagement portions are formed rearward of the first engagement portions in the attaching direction.

22 Claims, 13 Drawing Sheets

ACCESSORY SHOE DEVICE TO WHICH ACCESSORY IS ATTACHED, IMAGE PICKUP APPARATUS, AND ACCESSORY

BACKGROUND OF THE INVENTION

Field of the Invention

The present invention relates to an accessory shoe device to which an accessory is attached, an image pickup apparatus equipped with the accessory shoe device, and an accessory.

Description of the Related Art

As an image pickup apparatus, there has been known one equipped with an accessory shoe device to which a photographic accessory (hereinafter simply referred to as "the accessory") can be attached. The accessory shoe device of the image pickup apparatus is provided with an engagement portion for attachment of an accessory.

As the accessory attachable to the accessory shoe device, there may be mentioned not only an external strobe device, but also an electronic viewfinder (external display device) provided with a small-sized liquid crystal screen. In an area of the engagement portion of the accessory shoe device to which the electronic viewfinder can be attached, there is provided a connection connector comprised of a plurality of connection terminals for attachment of the electronic viewfinder, in addition to connection terminals for connection to the external strobe device. Thus, the accessory shoe device has a configuration in which the two kinds of accessories, i.e. the external strobe device and the electronic viewfinder, can be selectively attached to the single engagement portion (see Publication of Japanese Patent No. 4042717).

The accessory shoe device for attachment of the external strobe device has a shape defined by JIS. JIS defines the shape of the engagement portion for engagement with a connector portion of an accessory, and the positional relationship between the external strobe device and a synchronizer contact.

As for the electronic viewfinder, there has recently been a tendency toward multi-polarization, i.e. a tendency toward an increased number of connection signal terminals for connection to an image pickup apparatus according to an increasing demand for an increased number of pixels and a higher frame rate. Under these circumstances, it is desired to develop a connection connector and an accessory shoe device which are capable of meeting the needs of an increased number of connection signal terminals, but it is difficult to multi-polarize a connection connector in an accessory shoe device having its shape specified by the standards, due to restriction of space.

SUMMARY OF THE INVENTION

The present invention provides an accessory shoe device which makes it possible to multi-polarize a connection connector for connection to an accessory, within the shape of an engagement portion without degrading the versatility of the accessory shoe device.

In a first aspect of the invention, there is provided an accessory shoe device comprising an engagement member configured to have an accessory attached thereto, a signal terminal connector having a plurality of contacts arranged in a lateral direction intersecting an attaching direction of the accessory, a pair of first engagement portions formed in the engagement member in a manner spaced from each other by a first width in the lateral direction of the engagement member, and a pair of second engagement portions formed in the engagement member in a manner spaced from each other by a second width which is larger than the first width, wherein the signal terminal connector is disposed at a location forward of the first engagement portions in the attaching direction of the accessory, wherein a length of the signal terminal connector in the lateral direction is larger than the first width and smaller than the second width, and wherein the second engagement portions are formed rearward of the first engagement portions in the attaching direction of the accessory.

In a second aspect of the invention, there is provided an image pickup apparatus including an accessory shoe device for attachment of an accessory, wherein the accessory shoe device comprises an engagement member configured to have an accessory attached thereto, a signal terminal connector having a plurality of contacts arranged in a lateral direction intersecting an attaching direction of the accessory, a pair of first engagement portions formed in the engagement member in a manner spaced from each other by a first width in the lateral direction of the engagement member, and a pair of second engagement portions formed in the engagement member in a manner spaced from each other by a second width which is larger than the first width, wherein the signal terminal connector is disposed at a location forward of the first engagement portions in the attaching direction of the accessory, wherein a length of the signal terminal connector in the lateral direction is larger than the first width and smaller than the second width, and wherein the second engagement portions are formed rearward of the first engagement portions in the attaching direction of the accessory.

In a third aspect of the invention, there is provided an accessory to be attached to an engagement member of an accessory shoe device, the accessory shoe device including an engagement member configured to have an accessory attached thereto, a signal terminal connector having a plurality of contacts arranged in a lateral direction intersecting an attaching direction of the accessory, a pair of first engagement portions formed in the engagement member in a manner spaced from each other by a first width in the lateral direction of the engagement member, and a pair of second engagement portions formed in the engagement member in a manner spaced from each other by a second width which is larger than the first width, wherein the signal terminal connector is disposed at a location forward of the first engagement portions in the attaching direction of the accessory, wherein a length of the signal terminal connector in the lateral direction is larger than the first width and smaller than the second width, and wherein the second engagement portions are formed rearward of the first engagement portions in the attaching direction of the accessory, the accessory comprising a plurality of connection terminals for contact with terminals of the signal terminal connector, wherein the connection terminals each include an extended portion extended in the attaching direction of the accessory and having an extremity for contact with an associated one of the terminals of the signal terminal connector, and a vertical portion connected to the extended portion.

According to the invention, it is possible to multi-polarize a connection connector for connection to an external display device within the shape of an engagement portion without degrading the versatility of the accessory shoe device. Further, it is possible to provide an accessory for attachment to the accessory shoe device having the multi-polarized connection connector.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
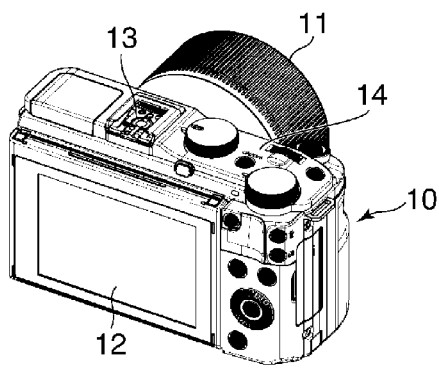
FIG. 1A is a rear perspective view of an image pickup apparatus according to an embodiment of the present invention.
Figure 1B:
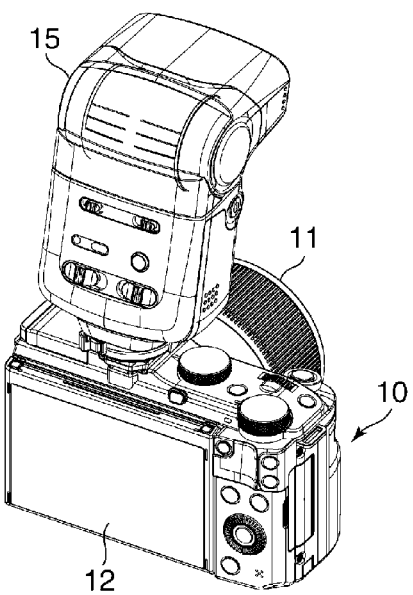
FIG. 1B is a rear perspective view of the image pickup apparatus with an external strobe device attached to an accessory shoe device thereof.
Figure 1C:
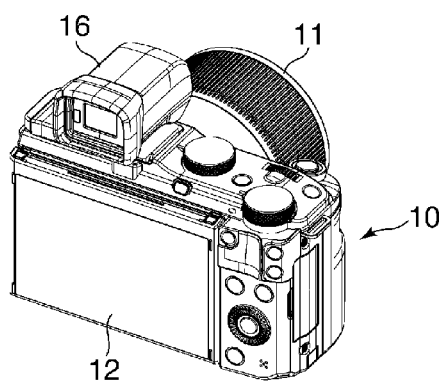
FIG. 1C is a rear perspective view of the image pickup apparatus with an external display device attached to the accessory shoe device thereof.
Figure 1D:
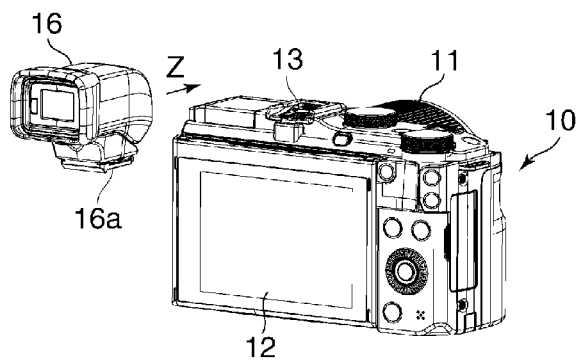
FIG. 1D is a view showing how the external display device is attached to the accessory shoe device.

FIGS. 1A to 1D are views of an image pickup apparatus according to an embodiment. FIG. 1A is a rear perspective view of the image pickup apparatus, and FIG. 1B is a rear perspective view of the image pickup apparatus with an external strobe device attached thereto. Further, FIG. 1C is a rear perspective view of the image pickup apparatus with an external display device attached thereto, and FIG. 1D is a view showing how the external display device is attached to an accessory shoe device of the image pickup apparatus.

As shown in FIG. 1A, the image pickup apparatus 10 is provided with a lens barrel 11 for taking an object image into an image pickup device, not shown, a liquid crystal monitor 12, an accessory shoe device (hereinafter simply referred to as "the accessory shoe") 13, and a top cover 14. A user of the image pickup apparatus 10 can check an object image by the liquid crystal monitor 12. The accessory shoe 13 as a photographic accessory mount forms a part of the top cover 14.

In FIG. 1B, the accessory shoe 13 of the image pickup apparatus 10 has the external strobe device (hereinafter simply referred to as "the external strobe"), denoted by reference numeral 15, attached thereto as an accessory. The external strobe 15 is used to irradiate an object with light for shooting. Further, in FIG. 1C, the accessory shoe 13 of the image pickup apparatus 10 has an electronic viewfinder 16 attached thereto as an external display device equipped with a small-sized liquid crystal device. The user of the image pickup apparatus 10 can check an object image to be taken into the image pickup device, by the electronic viewfinder 16, similarly to the case of using the liquid crystal monitor 12.

Further, as shown in FIG. 1D, the electronic viewfinder 16 is equipped with a connection plug 16a for connection to the accessory shoe 13 provided in the body of the image pickup apparatus 10. The electronic viewfinder 16 is attached to the image pickup apparatus 10 by sliding the same in a Z direction indicated by an arrow appearing in FIG. 1D, to cause the connection plug 16a to be engaged with the accessory shoe 13. The sliding direction corresponds to a direction from the rear i.e. the liquid crystal monitor side of the image pickup apparatus 10, toward the lens barrel 11.

Next, a description will be given of the arrangement of the accessory shoe 13.

Figure 2A:
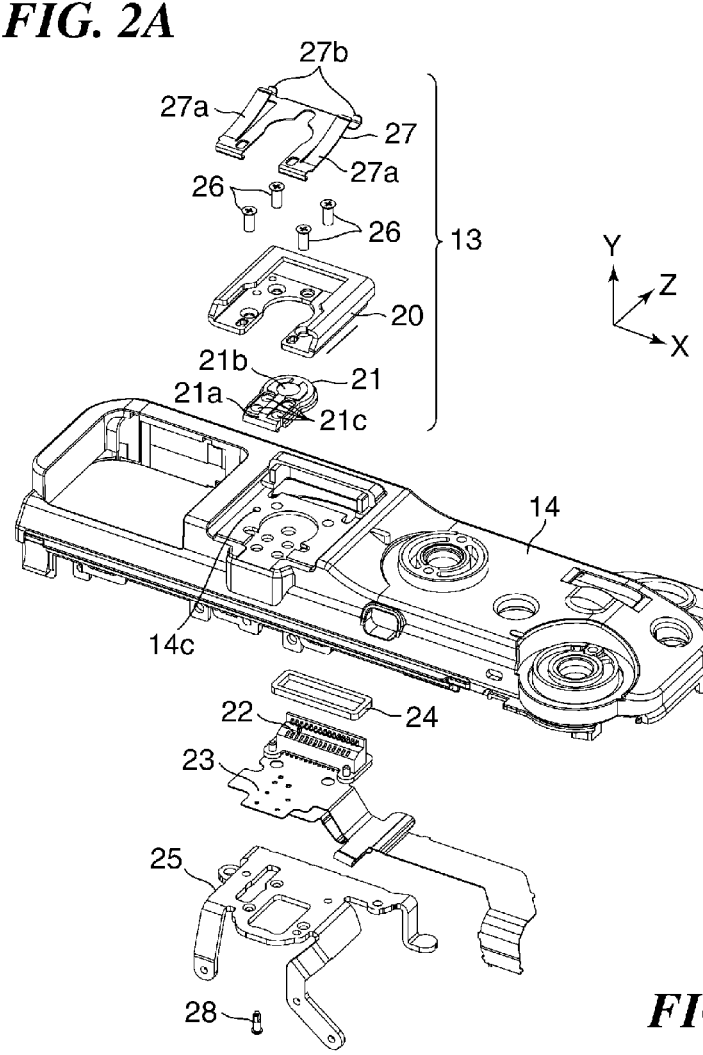
FIG. 2A is an exploded perspective view showing the accessory shoe device of the image pickup apparatus in a disassembled state, together with a top cover.
Figure 2B:
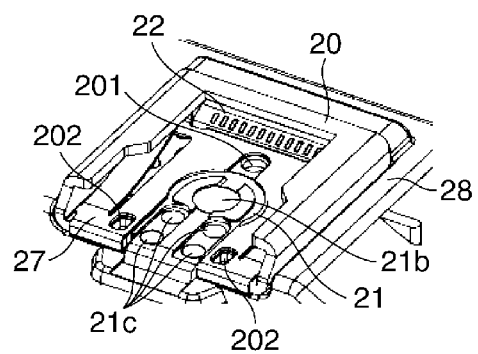
FIG. 2B is an assembled perspective view of the accessory shoe device.

FIGS. 2A and 2B are views showing the arrangement of the accessory shoe 13 of the image pickup apparatus 10 shown in FIGS. 1A to 1D. FIG. 2A is an exploded perspective view showing the accessory shoe 13 in a disassembled state, together with the top cover 14, and FIG. 2B is an assembled perspective view of the accessory shoe 13.

In FIG. 2A, the Z direction indicated by an arrow Z corresponds to a direction in which an accessory is attached to the accessory shoe 13. An X direction indicated by an arrow X corresponds to a direction orthogonally intersecting the accessory attaching direction and parallel to the longitudinal direction of the top cover 14. A Y direction indicated by an arrow Y corresponds to a direction orthogonally intersecting the accessory attaching direction and the longitudinal direction of the top cover 14, and this direction corresponds to a direction in which the accessory shoe 13 is assembled to the top cover 14. Note that the top cover 14 is an exterior member that forms the appearance of the top surface of the image pickup apparatus 10.

As shown in FIGS. 2A and 2B, the accessory shoe 13 is mainly comprised of an engagement member 20, a signal terminal stage 21 for the external strobe 15, a signal terminal connector 22 for the electronic viewfinder 16, and an accessory shoe spring 27.

The engagement member 20 is a member for holding the external strobe 15 or the electronic viewfinder 16 as an accessory, by engagement therewith. The signal terminal stage 21 for the external strobe 15 (hereinafter simply referred to as "the signal terminal stage 21") is comprised of a stage base member 21a made of a synthetic resin material, a synchronizer contact 21b held by the stage base member 21a, and a plurality of contacts 21c. The signal terminal stage 21 is positioned by a first positioning portion 20d (see FIGS. 3A to 3D) of the engagement member 20. The signal terminal stage 21 is a connection terminal for communication of a signal with the external strobe device 15.

The signal terminal connector 22 for the electronic viewfinder 16 (hereinafter simply referred to as "the signal terminal connector 22") is provided with a plurality of terminals (see FIG. 3C) arranged side by side at the same pitch in the X direction on a connector base member made of a synthetic resin. material.

Each of the synchronizer contact 21b and the contacts 21c of the signal terminal stage 21, and the terminals of the signal terminal connector 22 is electrically joined to a flexible circuit board 23 disposed under the top cover 14. The flexible circuit board 23 is connected to a main circuit board (not shown) of the image pickup apparatus 10, and is configured to be electrically connectable to the external strobe 15 and the electronic viewfinder 16. This enables the external strobe 15 or electronic viewfinder 16 attached to the engagement member 20 to communicate with the image pickup apparatus 10.

A packing member 24 shaped to surround the whole periphery of the signal terminal connector 22 is formed of a material, such as a rubber material, which can be largely deformed by a small force and has a large elastic deformation range.

An accessory shoe holding member 25 is a structural framework for holding the engagement member 20, and is positioned with respect to the top cover 14 by a fastening portion (not shown). The fastening portion is provided with four screws 26, for example, and each of the screws 26 extends to the accessory shoe holding member 25 through the engagement member 20, the top cover 14, and the flexible circuit board 23, each appearing in FIG. 2A, and is fastened to the accessory shoe holding member 25 appearing in FIG. 2A.

The signal terminal stage 21 has an outer periphery thereof sandwiched by the engagement member 20 and the top cover 14, whereby the signal terminal stage 21 is fixed to the top cover 14. The signal terminal connector 22 is sandwiched by the top cover 14 and the accessory shoe holding member 25, whereby the packing member 24 is crushed to fill a gap between the top cover 14 and the signal terminal connector 22.

The accessory shoe spring 27 is formed of a conductive metal material. The accessory shoe spring 27 has elastic deformation portions 27a for urging an accessory attached to the engagement member 20 in the Y direction, and abutment surfaces 27b for abutment of the accessory in the Z direction. The top cover 14 is formed with a slide hole 14c, and a detection pin 28 is inserted through the slide hole 14c for contact with the accessory shoe spring 27.

A contact piece member 29 is disposed at a location opposed to the accessory shoe spring 27 via the detection pin 28. When there is no accessory attached to the accessory shoe 13, the contact piece member 29 is in contact with a pattern (not shown) formed on the flexible circuit board 23. When an accessory is attached to the accessory shoe 13, the detection pin 28 is pressed down in the Y direction by the accessory shoe spring 27. As a consequence, the contact piece member 29 is moved away from the pattern on the flexible circuit board 23, whereby attachment of the accessory is detected. Thus, the attachment of the accessory to the image pickup apparatus 10 is detected, whereafter the attached accessory is synchronized with the image pickup apparatus 10.

Referring to FIG. 2B, the engagement member 20 is provided so as to be engaged with and hold the external strobe 15 or the electronic viewfinder 16 as an accessory. Inside the engagement member 20, there is provided the signal terminal stage 21 as the connection terminal for communication with the external strobe 15. The synchronizer contact 21b is disposed in a central part of the signal terminal stage 21. The contacts 21c arranged in the vicinity of the synchronizer contact 21b are provided as communication terminals for controlling the external strobe 15 engaged with the engagement member 20.

The signal terminal connector 22 is disposed forward of the synchronizer contact 21b, as viewed in the attaching direction of the electronic viewfinder 16, i.e. in the direction indicated by the arrow Z in FIGS. 2A and 2B. Between the synchronizer contact 21b and the signal terminal connector 22, there is formed a first engagement hole 201 for engagement with a lock pin 155 (see FIGS. 4A and 4B) of the external strobe 15. In the vicinity of the contacts 21c, there are formed a pair of second engagement holes 202 for engagement with respective engagement lugs 165 (see FIGS. 6A and 6D) of the electronic viewfinder 16.

Next, a detailed description will be given of the main component members of the accessory shoe 13.

Figure 3A:
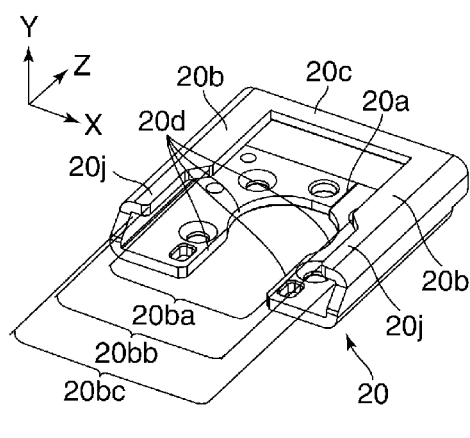
FIG. 3A is a top perspective view of as engagement member.
Figure 3B:
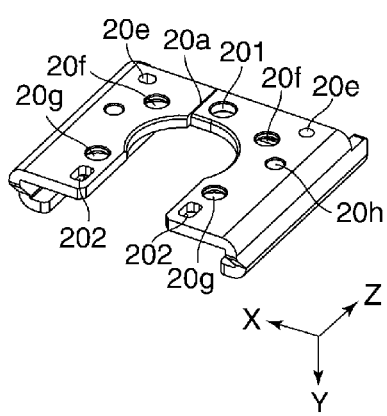
FIG. 3B is a bottom perspective view of the engagement member.
Figure 3C:
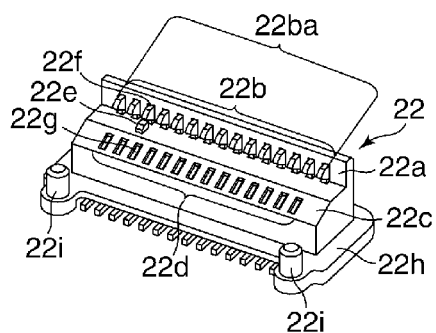
FIG. 3C is a perspective view of a signal terminal connector as a main component member of the accessory shoe device.
Figure 3D:
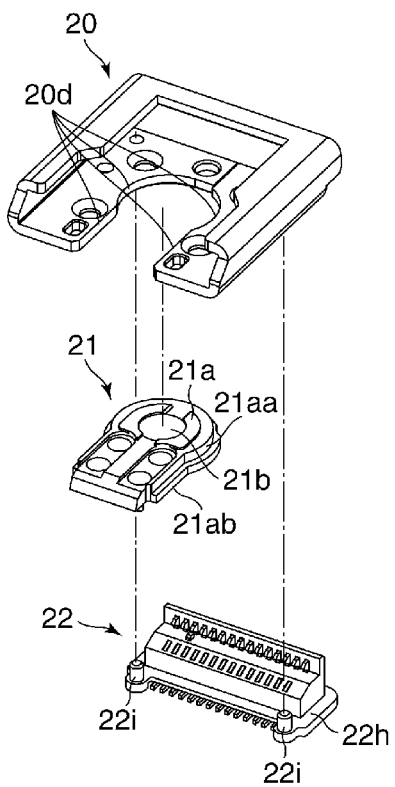
FIG. 3D is an exploded perspective view useful is explaining a positioning mechanism for positioning a signal terminal stage and the signal terminal connector with respect to the engagement member.

FIGS. 3A to 3D are views useful in explaining the main component members of the accessory shoe 13. FIG. 3A is a top perspective view of the engagement member 20, and FIG. 3B is a bottom perspective view of the same. Further, FIG. 3C is a perspective view of the signal terminal connector 22, and FIG. 3D is an exploded perspective view useful in explaining a positioning mechanism for positioning the signal term signal stage 21 and the signal terminal connector 22 with respect to the engagement member 20.

As shown in FIGS. 3A, 3B, and 3D, the engagement member 20 is formed by bending a metal material having a generally flat plate shape into a loop shape. More specifically, the plate-shaped metal material is bent such that end faces of respective opposite ends of the metal material abut each other in an opposed state whereby the plate-shaped metal material is formed into a loop shape. Portions of the opposed two end faces in abutment with each other forms a seam 20a.

The engagement member 20 has a pair of engagement portions 20b and a connection portion 20c that connects the pair of engagement portions 20b to each other. An upper portion, as viewed in FIG. 3B, which includes the seam 20a, of the engagement member 20 is formed with the first positioning portion 20d (denoted in FIG. 3A) for positioning the signal terminal stage 21, and a pair of second positioning portions 20e for positioning the signal terminal connector 22. Further, the engagement member 20 is formed With a pair of first screw holes 201 and a pair of second screw holes 20g for positioning the engagement member 20 itself with respect to the top cover 14. Furthermore, the engagement member 20 is formed with the first engagement hole 201 for engagement with the lock pin 155 of the external strobe 15, the pair of second engagement holes 202 for engagement with the respective two engagement lugs 165 of the electronic viewfinder 16, and a through hole 20h for insertion of the detection pin 28.

As shown in FIG. 3A, the pair of engagement portions 20b as first engagement portions are spaced from each other by a first width. The first width will be referred to as the first engagement portion spacing 20ba. The first engagement portion spacing 20ba is specified by the standards. A shoe mount leg 154 (see FIGS. 4A and 4B) of the external strobe 15 is inserted within the first engagement portion spacing 20ba. A pair of second engagement portions 201 are formed by partially cutting out component members forming the engagement portions 20b. The second engagement portions 20j are spaced from each other by a second width. The second width will be referred to as the second engagement portion spacing 20bb. The connection plug 16a of the electronic viewfinder 16 is inserted within the second engagement portion spacing 20bb of the second engagement portions 20j.

The second engagement portion spacing 20bb is larger than the first engagement portion spacing 20ba. Further, each of the first engagement portions 20b and the associated one of the second engagement portions 20j extend such that they are smoothly connected to each other by a sloped surface. Further, a shoe fitting spacing 20bc for positioning a shoe 150 of the external strobe 15 or the connection plug 16a of the electronic viewfinder 16 in the X direction is provided at a location downward of the first engagement portions 20b of the engagement member 20.

As described above, the first positioning portion 20d for positioning the first signal terminal stage 21 for an external strobe, described hereinafter, are formed in the substantially central portion of the engagement member 20. On the other hand, the second positioning portions 20e are formed as a pair of holes for positioning the signal terminal connector 22 for an electronic viewfinder, described hereinafter. The pair of second positioning portions 20e are formed apart from each other in the X direction at a location forward of the synchronizer contact 21b (see FIGS. 2A and 2B), as viewed in the Z direction.

The seam 20a is located between the first engagement hole 201 and one of the first screw holes 20f. The pair of first screw holes 20f are formed to be aligned in the X direction with a spacing therebetween. More specifically, the pair of first screw holes 20f function as a pair of first fastening holes formed to be spaced from each other in the X direction at respective locations forward of the synchronizer contact 21b in the Z direction.

The pair of second screw holes 20g are formed to be spaced from each other in the X direction. More specifically, the pair of second screw holes 20g function as a pair of second fastening holes formed to be spaced from each other in the X direction at respective locations rearward of the synchronizer contact 21b. The first engagement hole 201 is engageable with the lock pin 155 of the external strobe 15, and is formed between the pair of first screw holes 20f.

The pair of second engagement holes 202 are engageable with the respective pair of engagement lugs 165 of the viewfinder 16. The pair of second engagement holes 202 and the pair of second screw holes 20g are formed such that each of the second engagement holes 202 and an associated one of the second screw holes 20g are aligned in the Z direction. The second engagement holes 202 are located rearward of the respective second screw holes 20g in the Z direction.

As shown in FIG. 3C, the signal terminal connector 22 is formed with a first contact surface 22a extending perpendicular to the Z direction which is the attaching direction of the electronic viewfinder 16 described in detail hereinafter. A first terminal row 22b formed by a plurality of connection terminals is exposed from the first contact surface 22a. On a near side of the first contact surface 22a in the attaching direction of the electronic viewfinder 16, there is formed a second contact surface 22c sloped with respect to the first contact surface 22a. A second terminal row 22d formed by a plurality of connection terminals is exposed from the second contact surface 22c.

The individual terminals of the first terminal row 22b and those of the second terminal row 22d are arranged in staggered relation so as to minimize a terminal row width 22ba. However, in the electronic viewfinder 16, the number of connection signal terminals has been increased according to a demand for an increased number of pixels and a higher frame rate, so that the width of the first terminal row 22b and that of the second terminal row 22d are each larger than the spacing 20ba between the first engagement portions 20b of the engagement member 20.

Between the first contact surface 22a and the second contact surface 22c, there is formed a third surface. On the third surface, there is provided a fitting key 22e for regulating fitting relationship between the signal terminal connector 22 and the connection plug 16a of the electronic viewfinder 16. At least one of a first-row terminal 22f and a second-row terminal 22g located forward and rearward of the fitting key 22e, respectively, is a detection signal terminal for detecting connection of the connection plug 16a (see FIGS. 1D and 6A) of the electronic viewfinder 16. When an attempt is made to attach a wrong accessory having a similar shape, connection of the detection signal terminal to the accessory is prevented by shape regulation by the fitting key 22e. Consequently, when the wrong external accessory is erroneously attached to the image pickup apparatus 10, the detection signal terminal is not connected, so that communication between the accessory and the image pickup apparatus 10 is disabled. This configuration makes it possible to ensure a function that permits attachment of a specific accessory alone.

The signal terminal connector 22 has a flange 22h formed around the whole periphery thereof at a location upward of a lead portion for electrical connection to the flexible circuit board. The flange 22h is formed with a pair of positioning protrusions 22i protruding in the Y direction. The positioning protrusions 22i are located further outward of the lead portions of respective outermost terminals, which are joined to the circuit board, in the X direction which is a pitch direction in which the terminals are arranged. Further, the positioning protrusions 22i are located in a projection area of the engagement member 20 (where a shadow of the engagement member 20 is imaginarily projected) in the assembling direction (Y direction) of the accessory shoe 13 in which the accessory shoe 13 is assembled to the top cover 14. The positioning protrusions 22i are fitted in the respective second positioning portions 20e of the engagement member 20, whereby the signal terminal connector 22 and the engagement member 20 are positioned.

As shown in FIG. 3D, the engagement member 20 is formed with the first positioning portion 20d for positioning the signal terminal stage 21. The stage base member 21a of the signal terminal stage 21 is formed with an outer fitting portion 21aa for fitting in the first positioning portion 20d. Around the outer periphery of the outer fitting portion 21aa, there is formed a flange 21ab. The signal terminal stage 21 is positioned by fitting between the first positioning portion 20d and the outer fitting portion 21aa, and then the flange 21ab is sandwiched between the engagement member 20 and the top cover 14 (see FIGS. 2A and 2B), whereby the signal terminal stage 21 is fixed. In short, the signal terminal stage 21 is directly positioned with respect to the engagement member 20.

Further, the engagement member 20 is formed with the pair of positioning portions 20e for positioning the signal terminal connector 22. As described hereinbefore, the signal terminal connector 22 is formed with the pair of positioning protrusions 22i protruding in the Y direction for fitting in the respective second positioning portions 20e. The signal terminal connector 22 is positioned by fitting the pair of positioning portions 20e formed in the engagement member 20 on the pair of positioning protrusions 22i formed on the engagement member 20.

In the pitch direction (X direction) in which the terminals of the signal terminal connector 22 are arranged, the connection plug 16a (see FIG. 6A) of the electronic viewfinder 16 has its position regulated by the shoe fitting spacing 20bc (see FIG. 3A) of the engagement member 20. That is, the signal terminal connector 22 and the connection plug 16a are directly positioned with respect to the engagement member 20, and hence the positions of the signal terminal connector 22 and the connection plug 16a of the electronic viewfinder 16 can be determined with accuracy.

The signal terminal connector 22 is fixed by being sandwiched by the top cover 14 and the accessory shoe holding member 25 via the packing member 24 disposed on the flange 22h (see FIGS. 2A and 2B). The packing member 24 is configured to be capable of filling a gap between the signal terminal connector 22 and the top cover 14.

Next, a description will be given of the external strobe 15 which is attached to the accessory shoe 13.

Figure 4A:
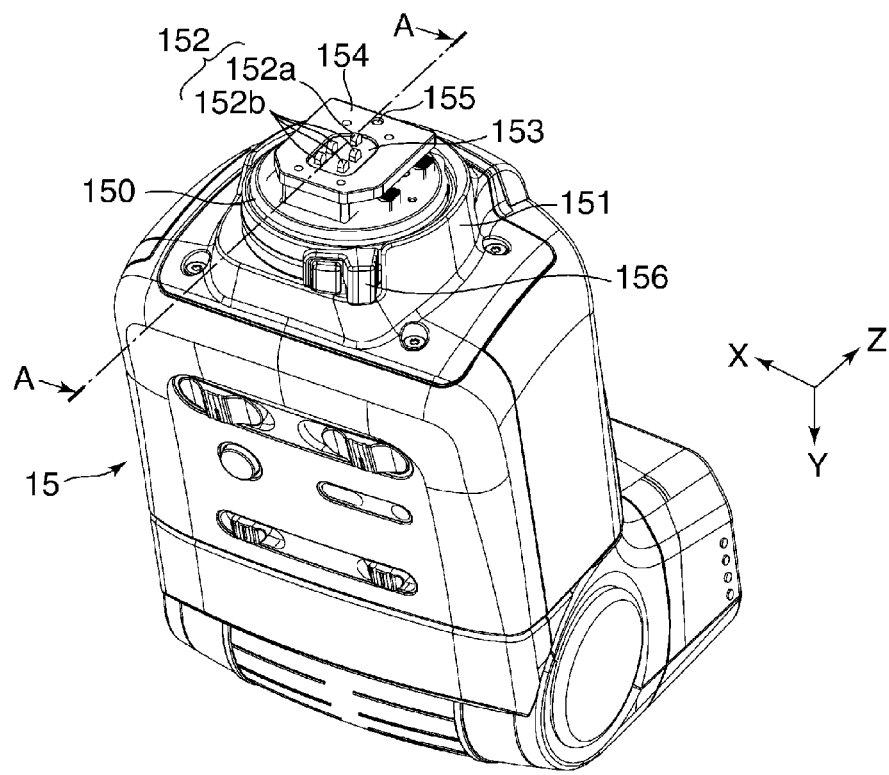
FIG. 4A is a perspective view of the external strobe device including a shoe.
Figure 4B:
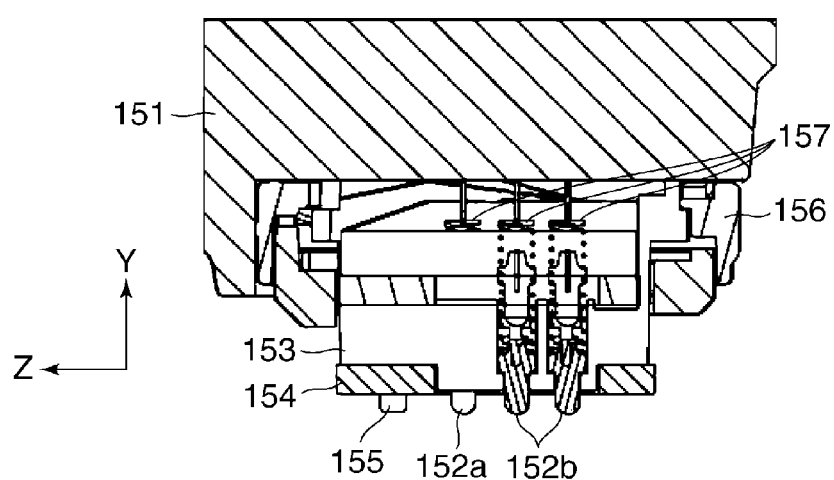
FIG. 4B is an enlarged cross-sectional view of the shoe of the external strobe device.

FIGS. 4A and 4B are views useful in explaining the arrangement of the external strobe 15. FIG. 4A is a perspective view of the shoe 150 of the external strobe 15, and FIG. 4B is an enlarged cross-sectional view useful in explaining the internal structure of the shoe 150 of the external strobe 15.

As shown in FIG. 4A, the shoe 150 is disposed at a location downward of a base part 151 of the external strobe 15, as viewed in a state normally attached to the accessory shoe 13 of the image pickup apparatus 10. Within the shoe 150, there are provided strobe connection terminals 152 that are brought into contact with the synchronizer contact 21b and the contacts 21c of the signal terminal stage 21 of the image pickup apparatus 10, for communication with the image pickup apparatus 10. The strobe connection terminals 152 are classified into a connection terminal 152a for connection to the synchronizer contact 21b and connection terminals 152b for connection to the respective contacts 21c other than the synchronizer contact 21b.

Within the shoe 150, there are provided a holding member 153 for accommodating the strobe connection terminals 152, and the shoe mount leg 154 provided at a bottom, as viewed in FIG. 4B, of the holding member 153. The shoe mount leg 154 is provided to cause the external strobe 15 to be engaged with the image pickup apparatus 10. The holding member 153 has the lock pin 155 mounted thereon for preventing the external strobe 15 from coming off the image pickup apparatus 10 after the shoe mount leg 154 has been attached to the accessory shoe 13 of the image pickup apparatus 10. The lock pin 155 is movable in the Y direction. The holding member 153 is provided with a lock lever 156 for enabling the lock pin 155 to move.

When the external strobe 15 is attached to the image pickup apparatus 10 and the lock lever 156 is rotated, the lock pin 155 is urged by a cam portion to be brought into engagement with the first engagement hole 201 formed in the accessory shoe 13 of the image pickup apparatus 10. The lock pin 155 and the first engagement hole 201 function as a Z-direction position regulation member for ensuring electrical connection between the external strobe 15 and the image pickup apparatus 10.

The strobe connection terminals 152 are urged by urging springs 157 provided on a side toward the base part 151 thereof, whereby extremities of the connection terminals 152a and 152b toward the image pickup apparatus 10 protrude from the holding member 153. Further, the strobe connection terminals 152 each have its end toward the base part 151 soldered to a lead, not shown, whereby the strobe connection terminals 152 are connected to a circuit section within the body of the external strobe 15.

Figure 5:
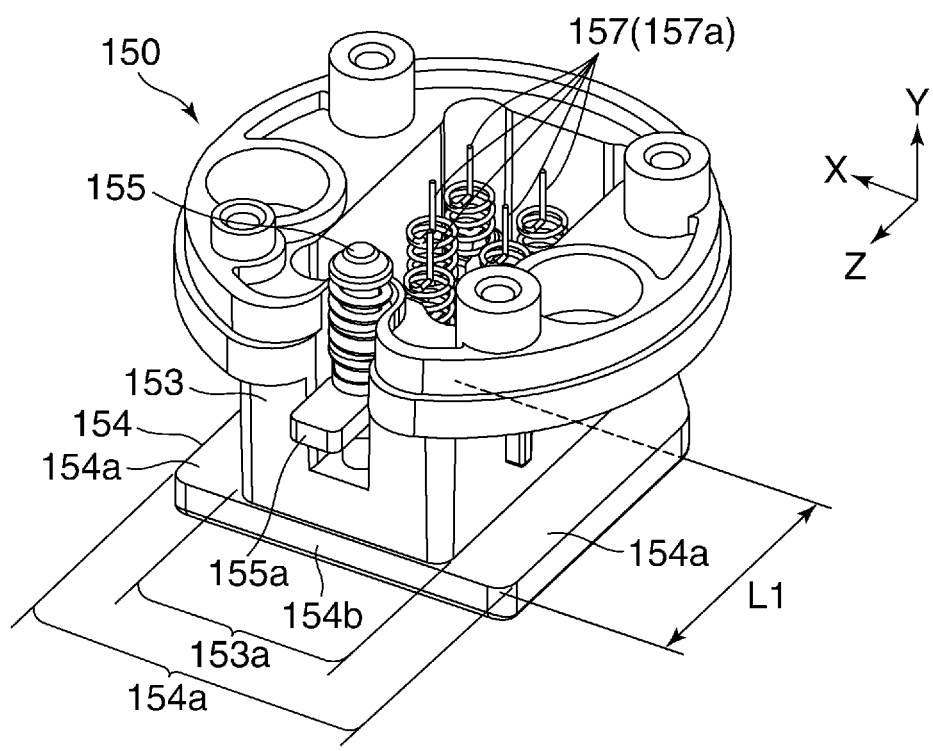
FIG. 5 is a perspective view of the shoe of the external strobe device.

FIG. 5 is a perspective view showing in detail the arrangement of the shoe 150 of the external strobe 15. FIG. 5 shows the shoe 150 in a state where the base part 151 (see FIGS. 4A and 4B) of the external strobe 15 is removed.

The shoe 150 is formed by fastening the shoe mount leg 154 and the holding member 153 to each other. The external strobe 15 has its X-direction position determined by fitting of a shoe fitting portion 154a of the shoe mount leg 154 into the shoe fitting spacing 20bc (see FIG. 3A) of the engagement member 20 of the accessory shoe 13. The external strobe 15 has its Y-direction position determined by abutment of the shoe fitting portion 154a with the engagement member 20, which is caused by the accessory shoe spring 27 urging the shoe mount leg 154 upward in the Y direction (see FIGS. 2A and 2B). Further, the external strobe 15 has its Z-direction position determined by abutment of a abutment surface 154b formed on the shoe mount leg 154 against the pair of abutment surfaces 27b formed on the accessory shoe spring 27.

The holding member 153 is also a structural framework for connecting the shoe mount leg 154 and the base part 151, and has a connection portion 153a formed to have a width insertable into the first engagement portion spacing 20ba (see FIG. 3A) of the engagement member 20. Within the connection portion 153a of the holding member 153, there are disposed the strobe connection terminals 152 (see FIGS. 4A and 4B), the urging springs 157 for urging the strobe connection terminal 152, and the lock pin 155.

As described with reference to FIGS. 4A and 4B, the strobe connection terminals 152 are classified into the connection terminal 152a for connection to the synchronizer contact 21b of the image pickup apparatus 10 and the connection terminals 152b for connection to the respective contacts 21c other than the synchronizer contact 21b. The connection terminal 152a for connection to the synchronizer contact 21b is located in a central portion of the shoe fitting portion 154a in the X direction, and a distance L1 from the abutment surface 154b is specified by the standards. On the other hand, the locations and shape of the connection terminals 152b for connection to the respective contacts 21c other than the synchronizer contact 21b are often different depending on the manufacturers.

The lock pin 155 is disposed in the central portion of the shoe fitting portion 154a at a location forward of the connection terminal 152a (see FIGS. 4A and 4B) for connection to the synchronizer contact 21b in the Z direction. As described hereinbefore, the engagement member 20 is formed with the first engagement hole 201 (see FIGS. 2B and 3B) through which the lock pin 155 is inserted. Now, if the first engagement hole 201 were located rearward of the synchronizer contact 21b in the Z direction, the connection terminal 152a would be fitted into the first engagement hole 201 during insertion of the external strobe 15 into the accessory shoe 13. To avoid this, the lock pin 155 is required to be located forward of the connection terminal 152a for connection to the synchronizer contact 21b in the Z direction. In short, the locations and shape of the connection terminals 152b for connection to the respective contacts 21c other than the synchronizer contact 21b may be different depending on the manufacturers, but the lock pin 155 is necessarily located forward of the connection terminal 152a for connection to the synchronizer contact 21b in the Z direction.

The lock pin 155 has a contact portion 155a for contact with the cam portion formed on the inner wall of the lock lever 156 (see FIGS. 4A and 4B). When the lock lever 156 is rotated, the contact portion 155a moves along the cam portion, whereby the lock pin 155 also moves in the Y direction in unison with the contact portion 155a.

The strobe connection terminal 152 (see FIGS. 4A and 4B) is urged by the urging springs 157 provided inside. A tip 157a of each of the urging springs 157 is soldered to an external strobe circuit board, not shown, via a lead, not shown, whereby electric signals are transmitted from the strobe connection terminals 152 to the external strobe circuit board via the urging springs 157.

Next, a description will be given of the electronic viewfinder 16 which is attached to the accessory shoe.

Figure 6A:
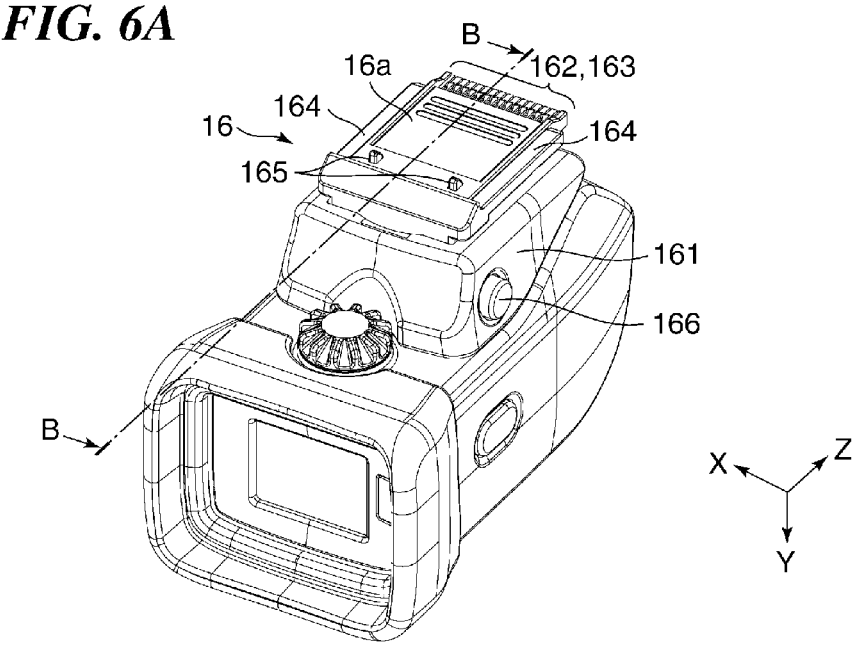
FIG. 6A is a perspective view of an electronic viewfinder including a connection plug.
Figure 6B:
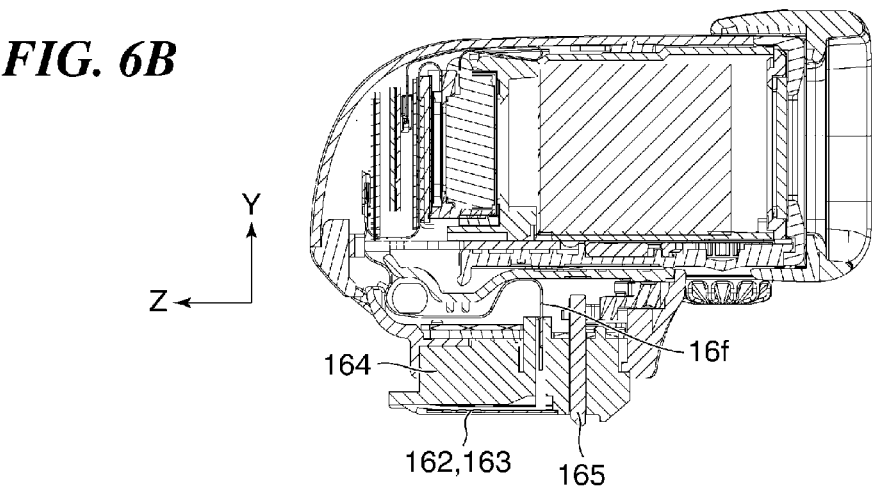
FIG. 6B is a cross-sectional view of the electronic viewfinder.
Figure 6C:
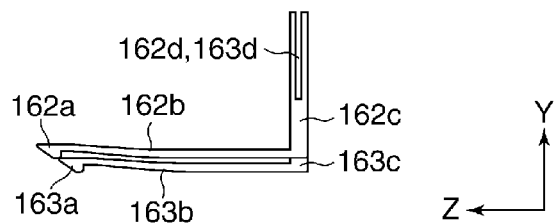
FIG. 6C is a side view of connection terminals of the electronic viewfinder.

FIGS. 6A to 6C are views useful in explaining the electronic viewfinder 16. FIG. 6A is a perspective view of the connection plug 16a of the electronic viewfinder 16, FIG. 6B is a cross-sectional view showing the internal structure of the electronic viewfinder 16, and FIG. 6C is a side view of connection terminals.

Referring to FIGS. 6A to 6C, the connection plug 16a is disposed on a base part 161 of the electronic viewfinder 16. The connection plug 16a of the electronic viewfinder 16 has connection terminals 162 and 163 provided for contact with the respective contacts, for communication, which are exposed from the first and second contact surfaces 22a and 22c (see FIG. 3C) of the signal terminal connector 22 of the image pickup apparatus 10. The connection terminals 162 and 163 are accommodated and held in a terminal holding member 164. The terminal holding member 164 functions as a shoe mount leg for attachment of the electronic viewfinder 16 to the image pickup apparatus 10.

The terminal holding member 164 is provided with an unlock button 166 for moving the pair of engagement lugs 165 provided for preventing the electronic viewfinder 16 from coming off the image pickup apparatus 10 after the connection plug 16a is attached to the accessory shoe device 13 of the image pickup apparatus 10. Each engagement lug 165 is movable in a direction of protruding from the bottom surface of the connection plug 16a (i.e. in the Y direction), and is urged by an urging member, not shown, such as a spring, such that the engagement lug 165 can protrude from the bottom surface of the connection plug 16a. As the connection plug 16a is slidingly moved for attachment to the accessory shoe device 13 of the image pickup apparatus 10, the engagement lugs 165 are pressed by the bottom surface of the engagement member 20 of the accessory shoe 13 to be retracted in a +Y direction. Then, when the engagement lugs 165 come to respective locations where the pair of second engagement holes 202 are formed, the engagement lugs 165 are fitted in the second engagement holes 202 of the engagement member 20, respectively. The engagement lugs 165 and the second engagement holes 202 also function as a Z-direction position regulation member for ensuring electrical connection between the electronic viewfinder 16 and the image pickup apparatus 10.

The connection terminals 162 and 163 are associated in one-to-one correspondence with the contacts exposed from the first and second contact surfaces 22a and 22c (see FIG. 3C) of the signal terminal connector 22, respectively. Each connection terminal 162 has a tip 162a formed for contact with the first contact surface 22a of the mail terminal connector 22, and each connection terminal 163 has a tip 163a formed for contact with the second contact surface 22c of the signal terminal connector 22. The tip 162a is formed with an extending portion 162b that can be elastically deformed in the Y direction when the tip 162a is brought into contact with the first contact surface 22a of the signal terminal connector 22, and the tip 163a is formed with an extending portion 163b that can. be elastically deformed in the Y direction when the tip 163a is brought into contact with the second contact surface 22c of the signal terminal connector 22. The extending portions 162b and 163b are formed to extend rearward from the respective tips 162a and 163a in the Z direction. Further, the connection terminal 162 has a vertical portion 162c extending from the Z-direction rear end of the extending portion 162b in a direction substantially orthogonal to the extending portion 162b, and the connection terminal 163 has a vertical portion 163c extending from the Z-direction rear end of the extending portion 163b in a direction substantially orthogonal to the extending portion 163b. A tip end of each of the vertical portions 162c and 163c is formed into a generally U shape, whereby the tip ends of the respective vertical portions 162c and 163c are formed with connection portions 162d and 163d, respectively, for insertion of a flexible circuit board 16f which is connected to a main circuit board 16e of the electronic viewfinder 16.

Figure 7:
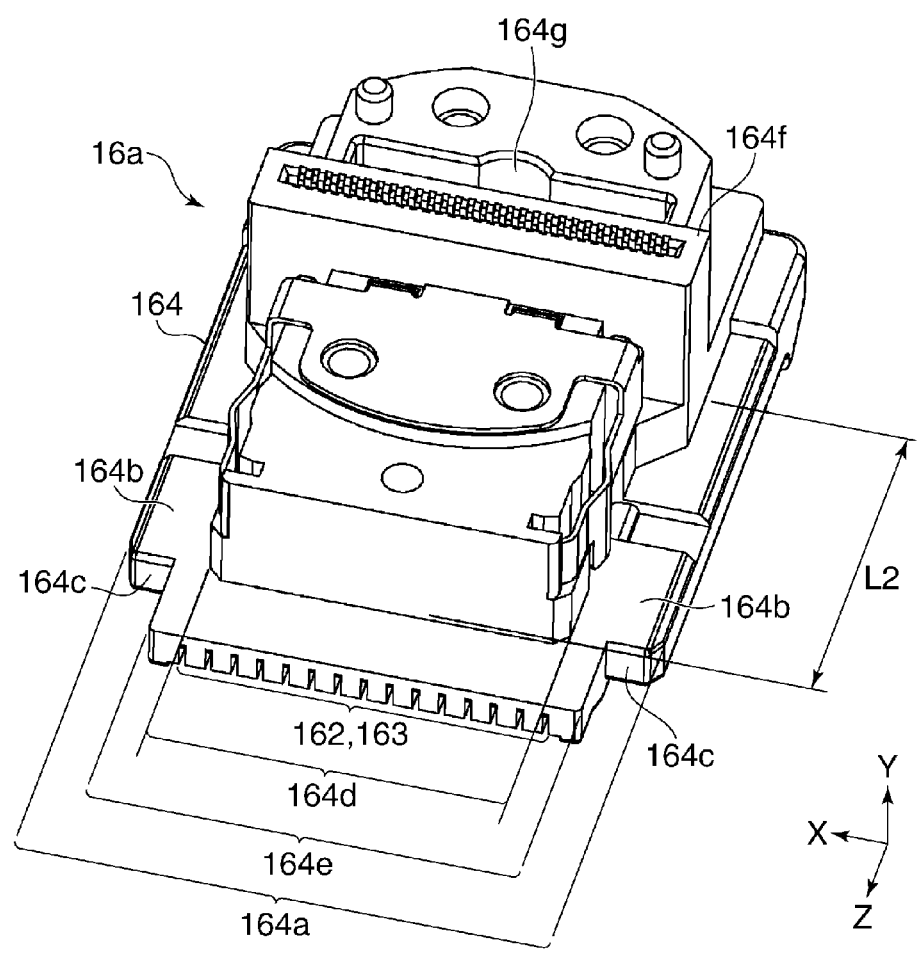
FIG. 7 is a perspective view of the connection plug of the electronic viewfinder.

FIG. 7 is a perspective view of the connection plug 16a of the electronic viewfinder 16, with the base part 161 (see FIG. 6A) of the electronic viewfinder 16 removed therefrom.

Referring to FIG. 7, the connection plug 16a includes the terminal holding member 164 made e.g. of a synthetic resin material which is a non-conductive material, and the connection terminals 162 and 163 held by the terminal holding member 164. The electronic viewfinder 16 has its X-direction position determined by fitting of a shoe fitting portion, indicated by reference numeral 164a, formed in the terminal holding member 164 into the shoe fitting spacing 20bc (see FIG. 3A) of the engagement member 20. The electronic viewfinder 16 has its Y-direction position determined by abutment of an abutment surface 164b thereof with the engagement member 20, which is caused by the accessory shoe spring 27 urging the terminal holding member 164 upward in the Y direction (see FIGS. 2A and 2B). Further, the electronic viewfinder 16 has its Z-direction position determined by abutment of abutment surfaces 164c formed on the terminal holding member 164 against the pair of abutment surfaces 27b formed on the accessory shoe spring 27.

The terminal holding member 164 is also a structural framework for connection to the base part 161, and has a connection portion 164d formed to have a width insertable into the first engagement portion spacing 20ba of the engagement member 20. Further, the terminal holding member 164 is formed with a tip holding portion 164e for holding the tips of the connection terminals 162 and 163 and a connection holding portion 164f for holding connection portions of the connection terminals 162 and 163. Each of the tip holding portion 164e and the connection holding portion 164f requires a width including resin thicknesses that ensure formation of resin portions extending outward in the X direction from the terminal row width 22ba (see FIG. 3C).

The connection holding portion 164f is formed to have a width insertable into the second engagement portion spacing 20bb (see FIG. 3A) of the engagement member 20. As a distance L2 between the connection holding portion 164f and the abutment surface 164c in the Z direction is longer, an area corresponding to the second engagement portion spacing 20bb of the engagement member 20 can be reduced.

At a location rearward of the terminal holding member 164 in the Z direction, there is formed an engagement lug accommodation space 164g for accommodating the engagement lugs 165. At a location forward of the connection holding portion 164f in the Z direction, there are disposed the extending portions 162b and 163b of the connection terminals 162 and 163, as described with reference to FIG. 6B, and therefore the engagement lug accommodation space 164g has to be disposed rearward of the connection holding portion 164f.

Figure 8A:
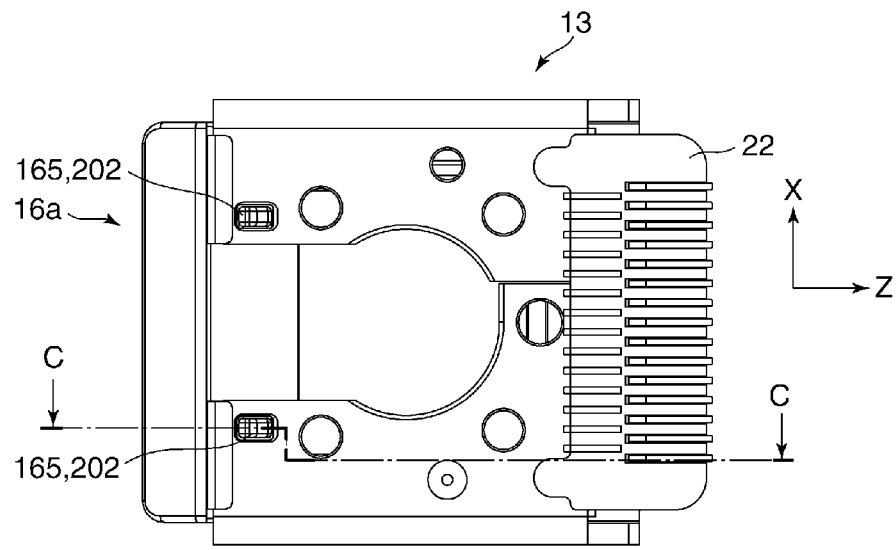
FIG. 8A is a bottom view of the connection plug of the electronic viewfinder in a state attached to the accessory shoe device.
Figure 8B:
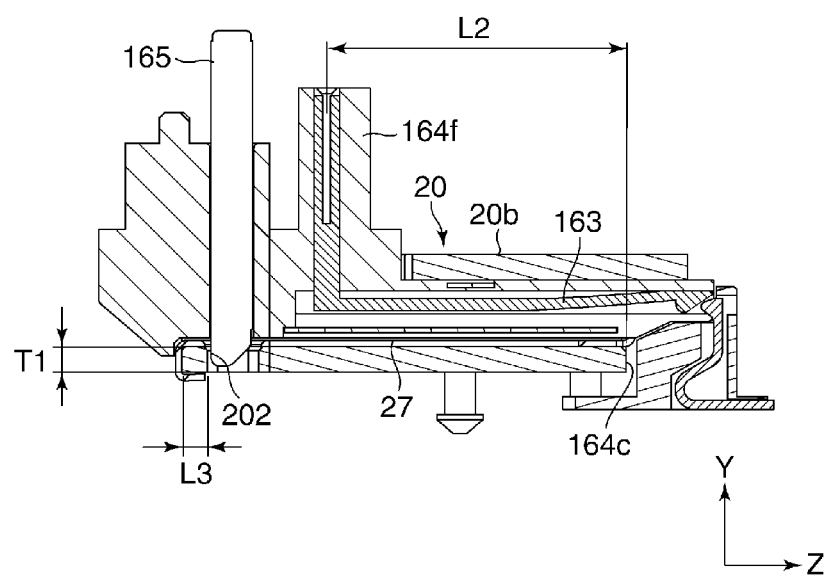
FIG. 8B is a cross-sectional view taken on line C-C of FIG. 8A.

FIGS. 8A and 8B are views of the connection plug 16a of the electronic viewfinder 16 in a state attached to the accessory shoe 13. FIG. 8A is a bottom view, and FIG. 8B is a cross-sectional view taken on line C-C of FIG. 6A.

As described hereinabove, as the number of pixels is increased and the frame rate of the electronic viewfinder 16 is made higher, the number of connection signal terminals is increased, so that the width of an area of the connection terminals 162 and 163 and the width 22ba of the row of connection terminals to be connected to the connection terminals 162 and 163 become larger than the first engagement portion spacing 20ba (see FIG. 3A) of the engagement member 20. More specifically, ones of the connection terminals 163 disposed at the respective ends of the connection plug 16a in the X direction extend under the respective pair of engagement portions 20b of the engagement member 20, and are electrically connected to the inside of the electronic viewfinder 16 from within an area corresponding to the second engagement portion spacing (spacing between the second engagement portions 20j) 20bb. In other words, the connection terminals located at the respective opposite ends of the signal terminal connector 22 in the X (width) direction are connected to associated connection terminals of the electronic viewfinder 16, at respective locations outside the first width (20ba) and inside the second width (20bb) in the width direction of the engagement member 20.

Note that by increasing the distance L2 between the abutment surface 164c and the holding portion. 164f, it is possible to secure an increased area of abutment between the engagement member 20 and the abutment surface 164b.

By increasing the abutment area, it is possible to suppress occurrence of play and tilting after the electronic viewfinder 16 is attached to the accessory shoe 13. Further, it is possible to prevent a photographic accessory from coming off the engagement member 20 even when the engagement member 20 receives a considerable amount of force due to application of a force to the front end of the photographic accessory in a +Z direction and is deformed to a certain degree.

The engagement lugs 165 are disposed rearward of the connection holding portion 164f in the Z direction. In order to increase the distance L2 between the abutment surface 164c and the holding portion 164f, it is required to dispose the engagement lugs 165 at a location as rearward as possible in the Z direction. The engagement lugs 165 are configured to be fitted in the respective second engagement holes 202 of the engagement member 20, and each of the second engagement holes 202 is formed at a location apart from the Z-direction rear end of the engagement member 20 by a distance L3 which makes it possible to machine the pair of second engagement holes 202 and secure the strength of the engagement member 20.

The engagement member 20 is generally formed by pressing a flat metal plate, and therefore it is desirable from the viewpoint of press working that, as a guide, the distance L3 is set to be larger than a thickness T1 of the plate forming the engagement member 20. From the viewpoint of strength, the distance L3 can be set, depending on the material, to be shorter than a for press working, and in this case, it is possible to employ another machining method, such as cutting.

Figure 9:
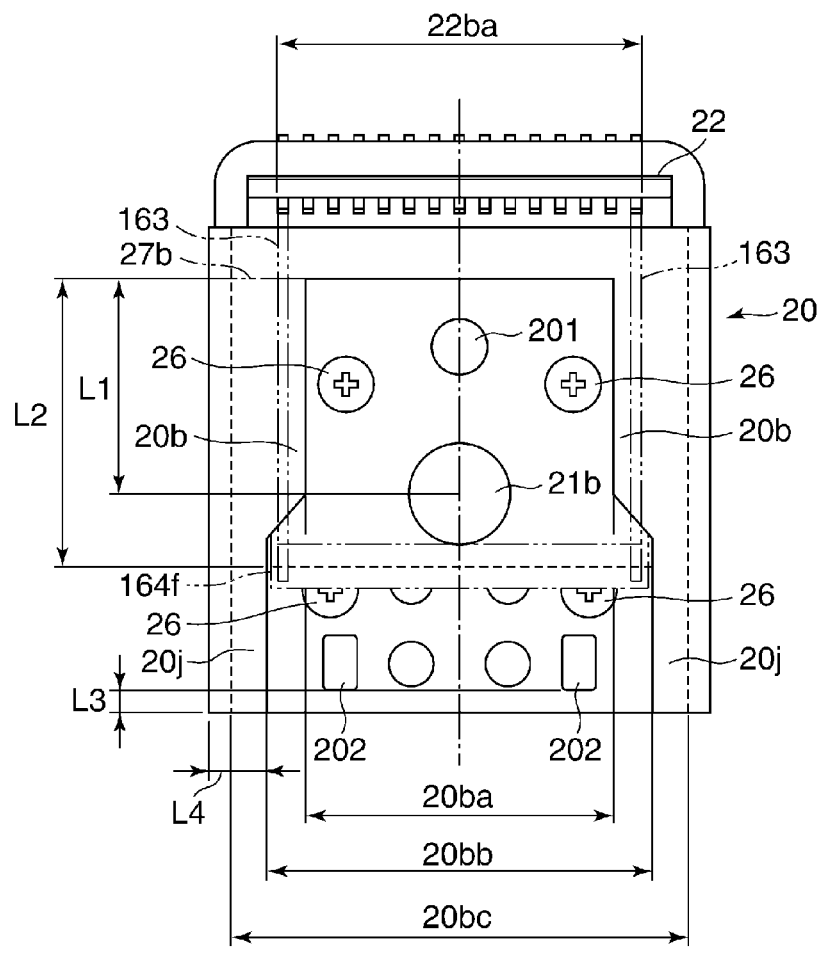
FIG. 9 is a top plan view of the connection plug in the FIG. 8B state.

FIG. 9 is a top plan view of the connection plug 16a in the FIG. 8B state.

Referring to FIG. 9, the engagement member 20 has the shoe fitting spacing 20bc, the first engagement portion spacing 20ba, and the second engagement portion spacing 20bb, in the X direction. The width 22ba of the terminal row of the signal terminal connector 22 is larger than the first engagement portion spacing 20ba and smaller than the second engagement portion spacing 20bb. That is, at least the connection terminals 163 disposed at the respective ends of the connection plug 16a in the X direction extend under the respective pair of engagement portions 20b of the engagement member 20, and are electrically connected to the inside of the electronic viewfinder 16 from within an area corresponding to the second engagement portion spacing (spacing between the second engagement portions 20j) 20bb.

A distance L4 from one X-direction end of the shoe fitting spacing 20bc to one end of the second engagement portion 20j on the same side is required to have a thickness that allows machining and ensure strength of the engagement member 20. The engagement member 20 is generally formed by pressing a flat metal plate, as mentioned hereinabove, and therefore it is desirable from the viewpoint of press working that, as a guide, the distance L4 is set to be 1.5 times larger than the thickness T1 of the plate of the engagement member 20 (i.e. 1.5×T1). From the viewpoint of strength, the distance L4 can be set, depending on the material of the plate, to be shorter than a limit for press working. In this case, however, it is preferable to employ another machining method, such as cutting.

Inside the engagement member 20, the synchronizer contact 21b is disposed for which the distance L1 from the abutment surfaces 27b is specified by the standards. In the second engagement portion spacing 20bb of the engagement member 20, there is disposed the connection holding portion 164f for which the distance L2 from the abutment surfaces 27b is specified by the standards.

The engagement member 20 has the pair of second engagement holes 202 formed therein at locations where the distance L3 from the Z-direction rear end is secured which makes it possible to machine the second engagement holes 202 and secure strength of the engagement member 20. By arranging the pair of second engagement holes 202 as rearward as possible in the Z direction, it is possible to increase the distance L2 between the abutment surfaces 27b and the connection holding portion 164f. In other words, it is possible to reduce the area of the second engagement portion spacing 20bb. This makes it possible to secure an increased area of abutment to thereby suppress occurrence of play and tilting after the electronic viewfinder 16 is attached to the accessory shoe 13. Further, it is possible to prevent an accessory from coming off the engagement member 20 even when the engagement member 20 receives a considerable amount of force due to application of a force to the front. end of the accessory in the +Z direction and is deformed to a certain extent.

As described with reference to FIGS. 2A and 2B, in the engagement member 20, the first engagement hole 201 (see FIG. 3B) for insertion of the lock pin 155 (see FIGS. 4A and 4B) of the external strobe 15 is located between the abutment surfaces 27b and the synchronizer contact 21b.

The four screws 26 for fastening the engagement member 20 are disposed in a hidden manner under the accessory shoe spring 27 (see FIGS. 2A and 2B) in the Y direction. The four screws 26 can be disposed without concern about the connection terminals 162 and 163 (see FIG. 6A) of the connection plug 16a of the electronic viewfinder 16. The four screws 26 are disposed in respective four areas divided by the X axis and the Z axis with the synchronizer contact 21b as a center, so that the engagement member 20 can be held in a well balanced manner.

As described above, in order to increase the number of connection signal terminals for the electronic viewfinder 16, it is required to wire under the first engagement portions 20b of the engagement member 20. If the connection holding portion 164f of the connection plug 16a of the electronic viewfinder 16 were disposed rearward of the first engagement portions 20b of the engagement member 20 in the Z direction, it would be impossible to form the lock mechanism (165 and 202) of the electronic viewfinder 16.

To solve this problem, in the present embodiment, the lock mechanism (165 and 202) of the electronic viewfinder 16 is shifted rearward in the Z direction to a location where the lock mechanism can be formed, and the area of the second engagement portion spacing 20bb is provided in part of the engagement member 20. As a consequence, the outermost connection terminals 162 and 163 extend horizontally outside the first engagement portions 20b and inside the second engagement portion spacing 20bb between the second engagement portions 201, and rises within the second engagement portion spacing 20bb located rearward of the first engagement portion 20b in the Z direction, whereby the outermost connection terminals 162 and 163 are connected to the inside of the electronic viewfinder 16. Further, the connection holding portion 164 can be disposed within an area where a shadow of the engagement member 20 is imaginarily projected in the Y direction, which eliminates the need to increase the size of the engagement member 20. Furthermore, even though the lock mechanism of the external strobe 15 or the electronic viewfinder 16 is disposed within the area where the shadow of the engagement member 20 is imaginarily projected in the Y direction, it is possible to reduce the area corresponding to the engagement portion spacing 20bb.

As described above, according to the present embodiment, it is possible to increase the number of connection terminals for connection to the electronic viewfinder within the shape of the engagement portion of the connection connector without degrading the versatility of the accessory shoe device.

Next, a description will be given, with reference to FIGS. 10A to 13B, of a digital camera which is an image pickup apparatus according to a second embodiment of the present invention. Components corresponding to those of the first embodiment are denoted by the same reference numerals, and detailed description thereof is omitted.

In the above-described first embodiment, to solve the problem that an increase in the number of connection terminals within the shape of the engagement member 20 reduces the terminal pitch of the signal terminal connector 22, the signal terminal connector 22 is formed with two contact surfaces from each of which a terminal row is exposed, and the terminals of one terminal row and those of the other are arranged in staggered relation so as to secure the terminal pitch of the signal terminal connector 22.

Figure 10A:
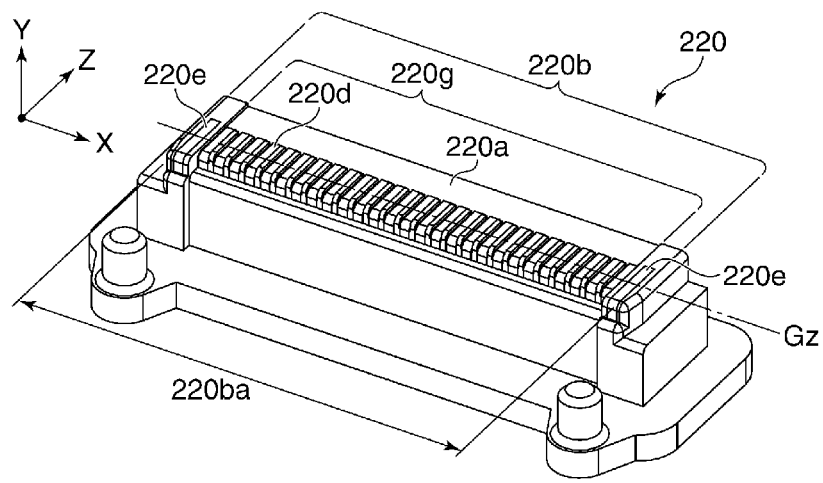
FIG. 10A is a perspective view of a signal terminal connector of a digital camera which is an image pickup apparatus according to a second embodiment of the present invention.
Figure 10B:
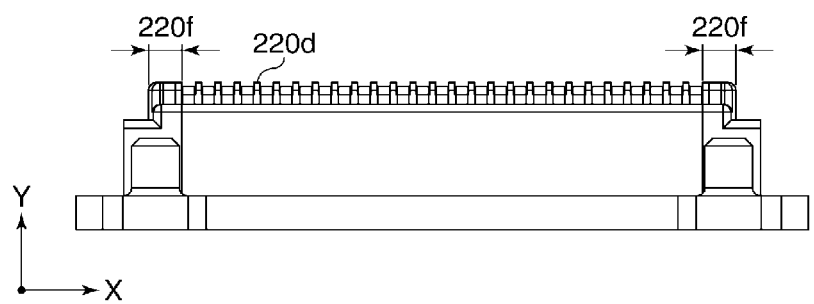
FIG. 10B is a front view of the signal terminal connector of the digital camera.
Figure 10C:
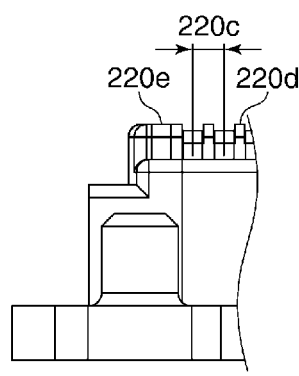
FIG. 10C is a partial enlarged view of FIG. 10B.

On the other hand, in the present embodiment, a technique is described, by way of example, which makes it possible to increase the number of connection terminals within the shape of the engagement member 20 even though the signal terminal connector 22 is formed with only a single contact surface, as shown in FIGS. 10A, 10B, and 10C.

FIG. 10A is a perspective view of a signal terminal connector 220, FIG. 10B is a front view of the signal terminal connector 220, and FIG. 10C is a partial enlarged view of FIG. 10B.

As shown in FIG. 10A, the signal terminal connector 220 is formed with a contact surface 220a extending horizontal in the Z direction which is the attaching direction of the electronic viewfinder 16. A terminal row 220b formed by a plurality of connection terminals is exposed from the contact surface 220a. The signal terminal connector 220 is manufactured by insert-molding the terminal row 220b formed by press working, in a state continuous with connection portions (not shown), with a resin material, and then cutting out the connection portions. Since the terminals of the signal terminal connector 220 are manufactured by insert molding, there is no gap between the terminal row 220b and the resin material, and hence no water droplets or the like invade therebetween.

A width 220ba of the terminal row 220b is smaller than the second engagement portion spacing 20bb (see FIG. 12) of the engagement member 20, and in order to increase the number of terminals within the small area of the width 220ba, it is required to reduce a terminal pitch 220c between adjacent terminals. However, assuming that the terminals are arranged at the reduced terminal pitch 220c, in a case where a small foreign matter is attached to the terminal row 220b, this can cause a short circuit between adjacent terminals thereof, resulting in occurrence of a signal failure.

To eliminate this possibility, in the present embodiment, a protruding rib 220d that protrudes in the Y direction from the contact surface 220a is formed between each adjacent pair of terminals of the signal terminal connector 220. This prevents, even when a small foreign matter is attached to one of the terminals, the small foreign matter from being brought into contact with the contact surface of a terminal adjacent thereto over the protruding rib 220d, so that it is possible to prevent occurrence of a short circuit between the adjacent terminals.

The signal terminal connector 220 is conveyed by air suction when it is mounted to the flexible circuit board 23 (see FIG. 2A). However, since the protruding ribs 220d are arranged in a center-of-gravity position Gz of the signal terminal connector 220 in the Z direction, it is difficult to secure a flat surface (X-Z plane) required for air suction.

To solve the problem, in the present embodiment, terminals 220e located at the respective opposite ends of the signal terminal connector 220 are disposed on the same plane as the protruding ribs 220d so that flat surfaces 220f required for air suction can be secured. Each of the terminals 220e is assigned not the role of a signal terminal, but the role of a ground terminal (GDN terminal), and hence even when a short circuit with a terminal adjacent to the terminal 220e is caused by attachment of a small foreign matter, it is possible to avoid occurrence of a signal failure.

In order to bring connection terminals 1610 of the electronic viewfinder 16 into contact with the terminal row 220b of the signal terminal connector 220, this operation is required to be performed in a sequence in which the outermost ones of the connection terminals 1610 are brought into contact with the respective ground terminals, and in this state, the other connection terminals 1610 are brought into contact with the other signal terminals. For this reason, the terminals 220e located at the respective opposite ends of the signal terminal connector 220 and each assigned the role of the ground terminal are extended to a location rearward of a signal terminal row 220g of the other terminals in the Z direction.

Figure 11A:
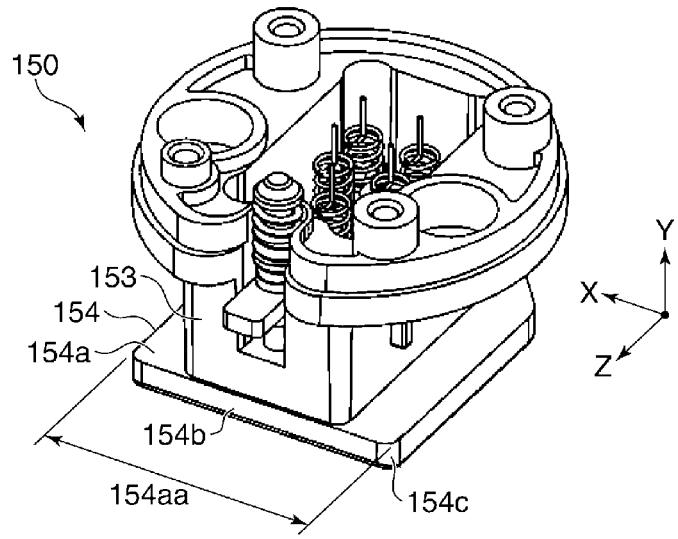
FIG. 11A is a perspective view useful is explaining the shoe of the external strobe device.

Next, a description will be given, with reference to FIGS. 11A, 11B, and 11C, of the shoe 150 of the external strobe 15 and a connection plug 160a of the electronic viewfinder 16. FIG. 11A is a perspective view of the shoe 150 of the external strobe 15, with the base part 151 (see FIGS. 4A and 4B) removed therefrom.

As shown in FIG. 11A, the shoe 150 of the external strobe 15 is formed by fastening the shoe mount leg 154 and the holding member 153 to each other. The external strobe 15 has its X-direction position determined by fitting of the shoe fitting portion 154a, which is formed in the shoe mount leg 154 and has its lateral width denoted by reference numeral 154aa, into the shoe fitting spacing 20bc (see FIG. 3A) of the engagement member 20 of the accessory shoe 13.

The shoe fitting portion 154a has opposite ends thereof each formed with a round-cornered portion 154c for guiding insertion of the shoe fitting portion 154a into the engagement member 20 of the accessory shoe 13. Further, the external strobe 15 has its Z-direction position determined by abutment of the abutment surface 154b formed on the shoe mount leg 154 against a pair of abutment surfaces 14d (see FIG. 13A) formed on the top cover 14, described hereinafter.

Figure 11B:
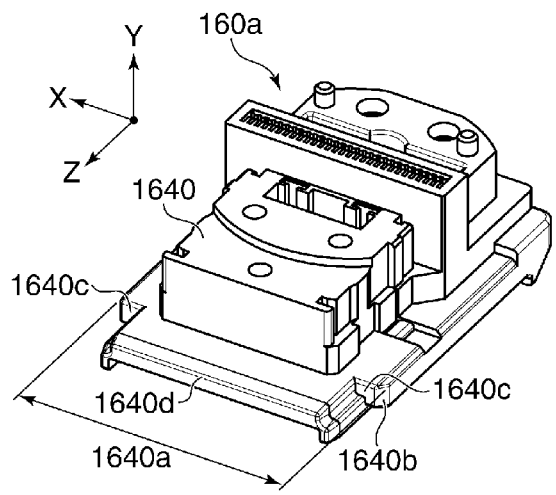
FIG. 11B is a perspective view of the connection plug of the electronic viewfinder.

FIG. 11B is a perspective view of the connection plug 160a of the electronic viewfinder 16 with the base part 161 (see FIG. 6A) removed therefrom. FIG. 11C a perspective view as viewed from the opposite surface side of FIG. 11B.

Figure 11C:
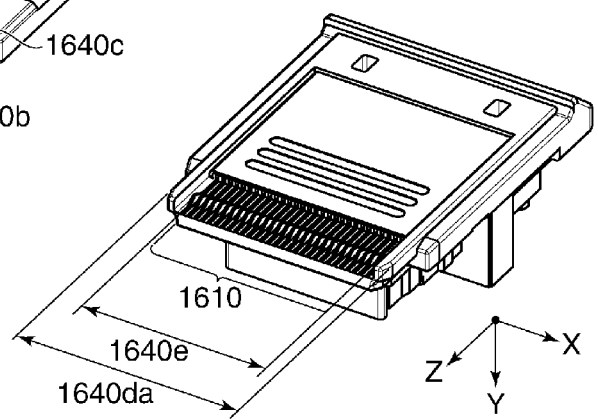
FIG. 11C is a perspective view of the connection plug, as viewed from the opposite surface side of FIG. 11B.

As shown in FIGS. 11B and 11C, the connection plug 160a includes a terminal holding member 1640 made e.g. of a synthetic resin material which is a non-conductive material, and the connection terminals 1610 held by the terminal holding member 1640.

The connection plug 160a is manufactured by hammering the connection terminals 1610 into the terminal holding member 1640 by an automatic machine, and hence, when the manufacturing costs are taken into account, it is desirable that the connection terminals 1610 have the same shape. For this reason, the ground terminals 220e located at the respective opposite ends of the signal terminal connector 220 and each assigned the role of a ground terminal of the signal terminal connector 220 are extended rearward in the Z direction, for connection performed in the above-mentioned sequence.

The electronic viewfinder 16 has its X-direction position determined by fitting of a shoe fitting portion 1640a formed in the terminal holding member 1640 into the shoe fitting spacing 20bc (see FIG. 3A) of the engagement member 20.

The shoe fitting portion 1640a has opposite ends thereof each formed with a tapered portion 1640b for guiding insertion of the shoe fitting portion 1640a into the engagement member 20 of the accessory shoe 13.

The electronic viewfinder 16 has its Z-direction position determined by abutment of abutment surfaces 1640c formed on the terminal holding member 1640 against the pair of abutment surfaces 14d (see FIG. 13A) formed on the top cover 14, described hereinafter. The terminal holding member 1640 is formed with a tip holding portion 1640d for covering and holding the tips of the respective connection terminals 1610.

Figure 12:
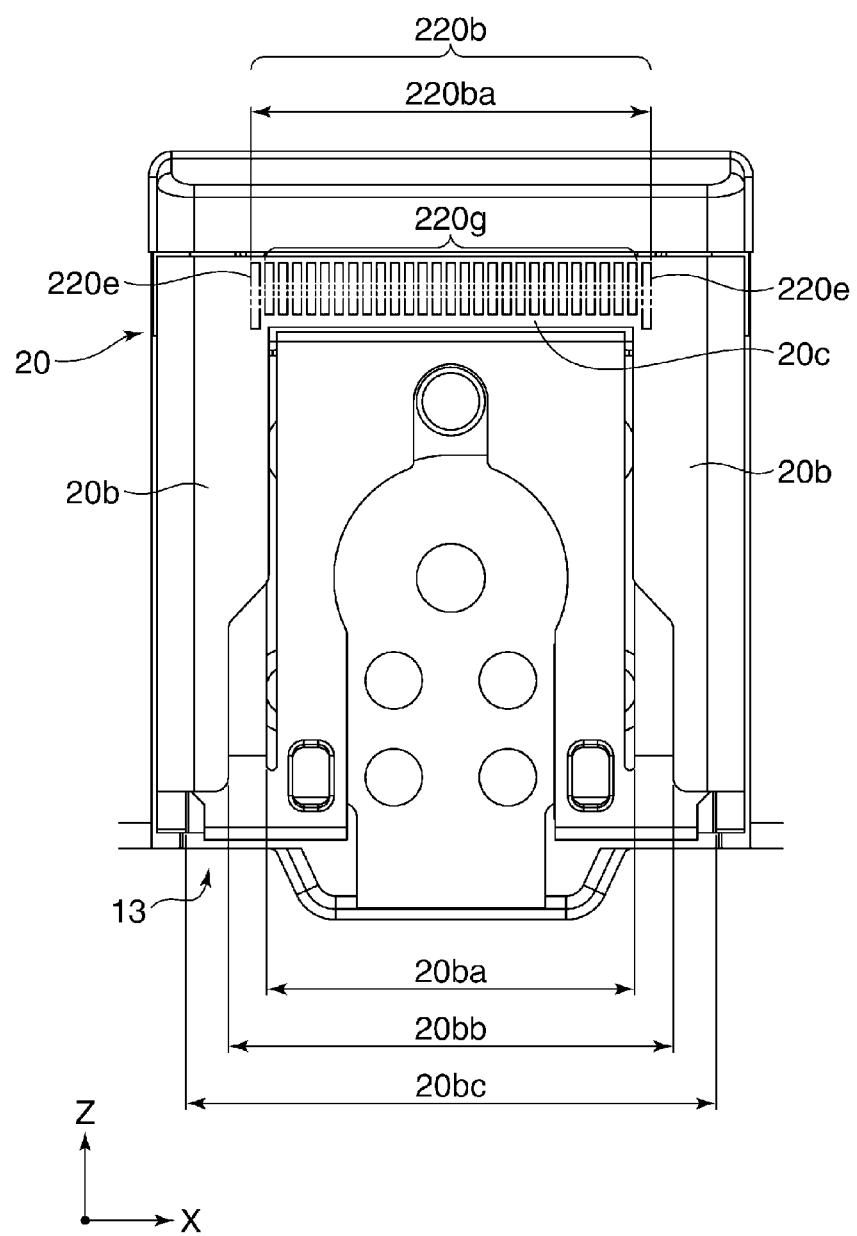
FIG. 12 is a top plan view of the accessory shoe device.

FIG. 12 is a top plan view of the accessory shoe 13. Note that in FIG. 12, the terminal row 220b of the signal terminal connector 220 hidden by the connection portion 20c of the engagement member 20 is indicated by two-dot chain lines.

As shown in FIG. 12, the engagement member 20 has the pair of first engagement portions 20b and the connection portion 20c that connects between the first engagement portions 20b. The pair of first engagement portions 20b and the connection portion 20c cover the terminal row 220b of the signal terminal connector 220, as viewed from above.

Further, as described hereinbefore, the engagement member 20 has the shoe fitting spacing 20bc, the first engagement portion spacing 20ba, and the second engagement portion spacing 20bb, in the X direction. The width 20ba of the terminal row 220b of the signal terminal connector 220 is set to be larger than the first engagement portion spacing 20ba and smaller than the second engagement portion spacing 20bb.

More specifically, at least the terminals 220e located at the respective opposite ends of the signal terminal connector 220 are disposed under the pair of first engagement portions 20b, respectively. The signal terminal row 220g of the signal terminal connector 220 is disposed under the connection portion 20c of the engagement member 20. Although the ground terminals 220e located at the respective opposite ends of the signal terminal connector 220 and each assigned the role of a ground are extended from the signal terminal row 220g, they are hidden by the respective first engagement portions 20b, as viewed from above. The terminals of the signal terminal row 220g are not required to be extended, and hence the connection portion 20c of the engagement member 20 need not be extended in the Z direction.

Figure 13A:
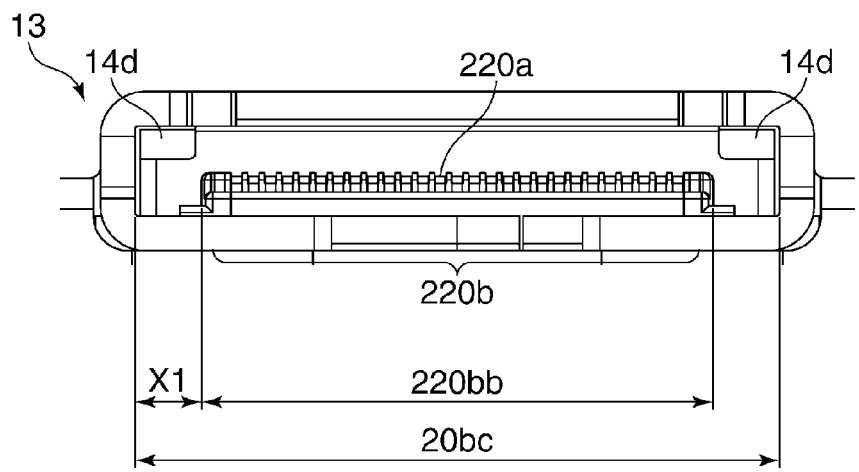
FIG. 13A is an elevation of the accessory shoe device, as viewed from the rear thereof in a Z direction.
Figure 13B:
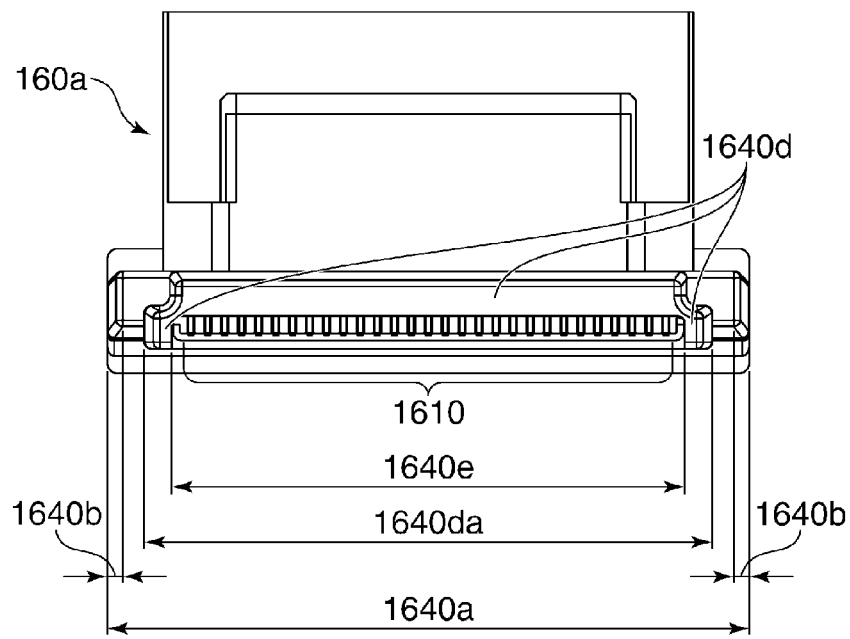
FIG. 13B is an elevation of the connection plug of the electronic viewfinder, as viewed from the front thereof in the Z direction.

FIG. 13A is an elevation of the accessory shoe 13, as viewed from the rear thereof in the Z direction, and FIG. 13B is an elevation of the connection plug 160a of the electronic viewfinder 16, as viewed from the front thereof in the Z direction.

As shown in FIG. 13A, the terminal row 220b of the signal terminal connector 220 of the accessory shoe 13 is insert-molded with a resin material, and is all covered except for the contact surface and a mounting surface. A width 220bb of the terminal holding portion of the signal terminal connector 220 is required to have a width including resin thicknesses that ensure formation of resin portions extending outward in the X direction from the terminal row 220b having the terminal row width 220ba (see FIG. 12).

As shown in FIG. 13B, the connection terminals 1610 of the electronic viewfinder 16 are held by the terminal holding member 1640 and has its side and top surfaces covered by the tip holding portion 1640d. Inside the tip holding portion 1640d, there is formed a fourth engagement portion spacing 1640e for regulating fitting relationship with the width 220bb of the terminal holding portion of the signal terminal connector 220. The tip holding portion 1640d. is required to have a width 1640da including resin thicknesses that ensure formation of resin portions extending outward in the X direction from the respective opposite ends of the fourth engagement portion spacing 1640e.

In the front of the electronic viewfinder 16, the positional relationship between the terminals in the X direction is determined by fitting of the fourth engagement portion spacing 1640e formed inside the tip holding portion 1640d into the width 220bb of the terminal holding portion of the signal terminal connector 220. The X-direction position of the rear of the electronic viewfinder 16 is determined by fitting of the shoe fitting portion 1640a formed in the terminal holding member 1640 into the shoe fitting spacing 20bc (see FIG. 3A) of the engagement member 20.

With an increase in the number of connection signal terminals, the width 220bb of the terminal holding portion of the signal terminal connector 220 of the accessory shoe 13 is increased, and a spacing X1 between each of the opposite ends of the signal terminal connector 220 and the associated end of the shoe fitting spacing 20bc of the engagement member 20 is reduced. Conventionally, the abutment surfaces 27b (see FIG. 2A) are formed on the spring 27 with the spacing X1 so as to perform abutment of an accessory thereagainst in the Z direction. Further, the height of each of the abutment surfaces 27b in the Y direction is set to substantially the same height as that of the contact surface 220a of the signal terminal connector 220.

The shoe fitting portion 1640a of the electronic viewfinder 16 and the shoe fitting portion 154a of the external strobe 15 (see FIGS. 11A to 11C) are formed with the tapered portions 1640b and the round-cornered portions 154c, respectively, each for guiding insertion of the shoe fitting portion 1640a or 154a into the shoe fitting spacing 20bc of the engagement member 20. The spacing X1 has been reduced due to an increase in the number of connection signal terminals, and hence, if the abutment surfaces 27b were formed to have a height which is not higher than substantially the same height as that of the contact surface 220a, as in the prior art, it is impossible to secure a sufficiently large abutment area, so that the abutment surfaces 27b would be brought into abutment with the tapered portions 1640b or the round-cornered portions 154c. In short, it would be impossible to stop an accessory, such as the electronic viewfinder 16 or the external strobe 15, at an intended position.

The top cover 14 has the abutment surfaces 14d formed within the spacing X1 at a location upward of the contact surface 220a in the Y direction. This arrangement enables each of the abutment surfaces 14d to secure an abutment area as large as the conventional one, making it possible to stop an accessory at the intended position.

As described above, according to the present embodiment, even in a case where the terminals of the signal terminal connector 220 are arranged in a single row, it is possible to increase the number of connection terminals for connection to the electronic viewfinder 16, within the shape of the engagement member 20 of the accessory shoe 13, without degrading the versatility of the accessory shoe device.

Note that although in the first and second embodiments, the electronic viewfinder is taken as an example of the multi-polarized accessory, the multi-polarized accessory may be a large-sized monitor or a microphone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application. No. 2016-018796, filed Feb. 3, 2016, and Japanese Patent Application No. 2016-227917 filed Nov. 24, 2016 which are hereby incorporated by reference wherein in their entirety.

What is claimed is:

1. An accessory shoe device comprising:
an engagement member configured to have an accessory attached thereto;
a signal terminal connector having a plurality of contacts arranged in a lateral direction intersecting an attaching direction of the accessory;
a pair of first engagement portions formed in the engagement member in a manner spaced from each other by a first width in the lateral direction of the engagement member; and
a pair of second engagement portions formed in the engagement member in a manner spaced from each other by a second width which is larger than the first width,
wherein the signal terminal connector is disposed at a location forward of the first engagement portions in the attaching direction of the accessory,
wherein a length of the signal terminal connector in the lateral direction is larger than the first width and smaller than the second width, and
wherein the second engagement portions are formed rearward of the first engagement portions in the attaching direction of the accessory.

2. The accessory shoe device according to claim 1, wherein the second engagement portions are formed by partially cutting out a component member of the first engagement portions.

3. The accessory shoe device according to claim 1, wherein signal terminals at respective opposite ends of the signal terminal connector in the lateral direction are disposed outside the first width and inside the second width in the lateral direction of the engagement member.

4. The accessory shoe device according to claim 1, wherein the signal terminals at the respective opposite ends of the signal terminal connector in the lateral direction are disposed under the pair of first engagement portions, respectively, and are extended rearward of the other signal terminals in the attaching direction of the accessory.

5. The accessory shoe device according to claim 4, wherein the signal terminals extended rearward in the attaching direction of the accessory are each assigned a role of a ground terminal.

6. The accessory shoe device according to claim 5, wherein between each two of the signal terminals of the signal terminal connector adjacent to each other in the lateral direction, there is formed a protruding rib protruding from a contact surface of the signal terminal connector, and the protruding rib has a height flush with contact surfaces of the ground terminals.

7. The accessory shoe device according to claim 1, wherein abutment surfaces of the accessory in the attaching direction are provided in respective areas which are between opposite ends of a width of a terminal holding portion of the signal terminal connector and opposite ends of a shoe fitting spacing of the engagement member for fitting of a shoe of the accessory in the attaching direction, and are upward of a contact surface of the signal terminal connector.

8. The accessory shoe device according to claim 1, wherein the engagement member is provided with an urging member for urging an accessory attached to the engagement member in a direction intersecting the attaching direction.

9. The accessory shoe device according to claim 8, wherein the engagement member is fastened to an image pickup apparatus body by a fastening section including a plurality of screws, and the screws are hidden by the urging member.

10. The accessory shoe device according to claim 1, wherein the accessory is an external strobe device,
   wherein between the pair of first engagement portions, there is disposed a signal terminal stage for causing the external strobe device to emit light, and
   wherein the pair of second engagement portions are located rearward of a synchronizer contact disposed in a central portion of the signal terminal stage, in the attaching direction of the accessory.

11. The accessory shoe device according to claim 10, wherein the engagement member has a first engagement hole associated with a lock pin of the external strobe device, and the first engagement hole is located forward of the synchronizer contact and rearward of the signal terminal connector, in an attaching direction of the external strobe device.

12. The accessory shoe device according to claim 11, wherein the lock pin regulates a position of the external strobe device with respect to the engagement member in the attaching direction of the external strobe device.

13. The accessory shoe device according to claim 10, wherein the engagement member is fastened to an image pickup apparatus body by a fastening section including a plurality of screws, and
   wherein the screws are disposed equally in respective four areas of the engagement member divided by the attaching direction of the external strobe device and the lateral direction orthogonal to the attaching direction, with the synchronizer contact as a center.

14. The accessory shoe device according to claim 1, wherein the accessory is an external display device, and
   wherein the engagement member has a second engagement hole associated with an engagement lug of the external display device, and the second engagement hole is located rearward of a central contact of terminals for causing another accessory than the external display device to function, in the attaching direction of the external display device.

15. The accessory shoe device according to claim 14, wherein the engagement lug regulates a position of the external display device with respect to the engagement member in the attaching direction of the external display device.

16. The accessory shoe device according to claim 14, wherein the signal terminal connector comprises terminals for connection to connection terminals of the external display device, and
   wherein signal terminals at respective opposite ends of the signal terminal connector in the lateral direction of the engagement member are disposed outside the first width and inside the second width in the lateral direction of the engagement member, for connection to associated ones of the connection terminals of the external display device.

17. The accessory shoe device according to claim 14, wherein the engagement member is fastened to an image pickup apparatus body by a fastening section including a plurality of screws, and
   wherein screws out of the plurality of screws, which are disposed rearward of the central contact of the signal terminals for causing the other accessory to function, in the attaching direction of the external display device, are located forward of the second engagement hole in the attaching direction of the external display device.

18. An image pickup apparatus including an accessory shoe device for attachment of an accessory,
   wherein the accessory shoe device comprises:
   an engagement member configured to have an accessory attached thereto;
   a signal terminal connector having a plurality of contacts arranged in a lateral direction intersecting an attaching direction of the accessory;
   a pair of first engagement portions formed in the engagement member in a manner spaced from each other by a first width in the lateral direction of the engagement member; and
   a pair of second engagement portions formed in the engagement member in a manner spaced from each other by a second width which is larger than the first width,
   wherein the signal terminal connector is disposed at a location forward of the first engagement portions in the attaching direction of the accessory,
   wherein a length of the signal terminal connector in the lateral direction is larger than the first width and smaller than the second width, and
   wherein the second engagement portions are formed rearward of the first engagement portions in the attaching direction of the accessory.

19. An accessory to be attached to an engagement member of an accessory shoe device,
   the accessory shoe device including:
   an engagement member configured to have an accessory attached thereto;
   a signal terminal connector having a plurality of contacts arranged in a lateral direction intersecting an attaching direction of the accessory;
   a pair of first engagement portions formed in the engagement member in a manner spaced from each other by a first width in the lateral direction of the engagement member; and
   a pair of second engagement portions formed in the engagement member in a manner spaced from each other by a second width which is larger than the first width,
   wherein the signal terminal connector is disposed at a location forward of the first engagement portions in the attaching direction of the accessory,
   wherein a length of the signal terminal connector in the lateral direction is larger than the first width and smaller than the second width, and
   wherein the second engagement portions are formed rearward of the first engagement portions in the attaching direction of the accessory,
   the accessory comprising:
   a plurality of connection terminals for contact with terminals of the signal terminal connector,
   wherein the connection terminals each include an extended portion extended in the attaching direct on of the accessory and having an extremity for contact with an associated one of the terminals of the signal terminal connector, and a vertical portion connected to the extended portion.

20. The accessory according to claim 19, wherein ones of the connections terminals at respective opposite ends in the lateral direction orthogonal to the attaching direction of the accessory to the engagement member are disposed outside the first width and inside the second width in the lateral direction of the engagement member, for connection to terminals of the signal terminal connector in the attaching direction of the accessory.

21. The accessory according to claim 19, wherein the plurality of connection terminals are held by a holding member formed of a non-conductive material, and the holding member has a first fitting portion which covers the extended portion of each connection terminal and is fitted between the first engagement portions of the engagement member, and a second fitting portion which covers the vertical portion of each connection terminal and is fitted between the second engagement portions of the engagement member.

22. The accessory according to claim 19, wherein the accessory is an external display device.

\* \* \* \* \*